US011955068B2

(12) United States Patent
Wu et al.

(10) Patent No.: US 11,955,068 B2
(45) Date of Patent: Apr. 9, 2024

(54) GAMMA STANDARD VOLTAGE GENERATING CIRCUIT, GAMMA DRIVING VOLTAGE GENERATING CIRCUIT AND DISPLAY DEVICE

(71) Applicant: BOE TECHNOLOGY GROUP CO., LTD., Beijing (CN)

(72) Inventors: Baoyun Wu, Beijing (CN); Zebang Guo, Beijing (CN); Hui Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 94 days.

(21) Appl. No.: 17/488,581

(22) Filed: Sep. 29, 2021

(65) Prior Publication Data

US 2022/0254306 A1 Aug. 11, 2022

(30) Foreign Application Priority Data

Feb. 8, 2021 (CN) ........................ 202110172186.9

(51) Int. Cl.
*G09G 3/3208* (2016.01)
*G09G 3/36* (2006.01)
*G09G 3/20* (2006.01)

(52) U.S. Cl.
CPC ......... *G09G 3/3208* (2013.01); *G09G 3/3696* (2013.01); *G09G 3/2074* (2013.01); (Continued)

(58) Field of Classification Search
None
See application file for complete search history.

(56) References Cited

U.S. PATENT DOCUMENTS 10,707,754 B2 * 7/2020 Takenaka .............. H02M 3/157
2009/0108744 A1 * 4/2009 Park ..................... G09G 3/3233 313/504

(Continued)

FOREIGN PATENT DOCUMENTS

CN 1992790 A 7/2007
CN 103198779 A 7/2013

(Continued)

OTHER PUBLICATIONS

China Patent Office, First Office Action dated Jun. 6, 2022 for application No. CN202110172186.9.

*Primary Examiner* — Patrick N Edouard
*Assistant Examiner* — Peijie Shen
(74) *Attorney, Agent, or Firm* — HOUTTEMAN LAW LLC

(57) ABSTRACT

Embodiments of the present disclosure provide a gamma standard voltage generating circuit, a gamma driving voltage generating circuit and a display device. The gamma standard voltage generating circuit includes: a constant voltage element for outputting a constant voltage; a following voltage element coupled to a driving voltage terminal, for outputting a following voltage changing with a driving voltage of the driving voltage terminal; a selecting element electrically coupled to the constant voltage element and the following voltage element, for outputting the following voltage 10 or the constant voltage as an output voltage; a comparison element electrically coupled to the selecting element, for controlling the selecting element to output the following voltage when the output voltage meets a preset standard, and controlling the selecting element to output the constant voltage when the output voltage does not meet the preset standard; the constant voltage does not meet the preset standard.

18 Claims, 5 Drawing Sheets

(52) U.S. Cl.
CPC ............... *G09G 2310/0297* (2013.01); *G09G 2320/0233* (2013.01); *G09G 2330/028* (2013.01)

(56) References Cited

U.S. PATENT DOCUMENTS

| | | | | |
|---|---|---|---|---|
| 2012/0007901 | A1* | 1/2012 | Yen ...................... | G09G 3/3648<br>345/698 |
| 2013/0176349 | A1* | 7/2013 | Park ..................... | G09G 3/3291<br>345/690 |
| 2015/0208479 | A1* | 7/2015 | Radermacher ......... | H05B 45/14<br>315/307 |
| 2018/0088156 | A1* | 3/2018 | Yamada ............... | H03K 5/2472 |
| 2019/0281242 | A1 | 9/2019 | Cheng et al. | |
| 2021/0383758 | A1* | 12/2021 | Yin ...................... | G09G 3/3233 |
| 2022/0215803 | A1* | 7/2022 | Pyun ........................ | G09G 3/20 |
| 2022/0223091 | A1* | 7/2022 | Chae ........................ | G09G 3/32 |

FOREIGN PATENT DOCUMENTS

| | | | |
|---|---|---|---|
| CN | 103366673 | A | 10/2013 |
| CN | 106058797 | A | 10/2016 |
| CN | 207833373 | U | 9/2018 |
| CN | 109003589 | A | 12/2018 |
| CN | 110867163 | A | 3/2020 |
| KR | 20080039719 | A | 5/2008 |
| KR | 20190059625 | A | 5/2019 |

* cited by examiner

GAMMA STANDARD VOLTAGE GENERATING CIRCUIT, GAMMA DRIVING VOLTAGE GENERATING CIRCUIT AND DISPLAY DEVICE

CROSS REFERENCE TO RELATED APPLICATIONS

This application claims priority to Chinese patent application No. 202110172186.9, filed at the Chinese intellectual property office on Feb. 8, 2021, the disclosure of which is incorporated herein by reference in its entirety.

TECHNICAL FIELD

The present disclosure relates to the field of display technology, and particularly relates to a gamma standard voltage generating circuit, a gamma driving voltage generating circuit and a display device.

BACKGROUND

In a display device such as an organic light emitting diode display device, a gamma driving voltage at each gray level, i.e., a data voltage Vdata for driving each pixel unit (sub-pixel) to display at the corresponding gray level, may be generated by dividing a gamma standard voltage.

SUMMARY

In a first aspect, an embodiment of the present disclosure provides a gamma standard voltage generating circuit, including:

a constant voltage element configured to output a constant voltage;

a following voltage element electrically coupled to a driving voltage terminal and configured to output a following voltage changing with a driving voltage of the driving voltage terminal;

a selecting element electrically coupled to an output terminal of the constant voltage element and an output terminal of the following voltage element, and configured to output the following voltage or the constant voltage as an output voltage at an output terminal thereof;

a comparison element electrically coupled to the output terminal of the selecting element, and configured to control the selecting element to output the following voltage when the output voltage meets a preset standard, and control the selecting element to output the constant voltage when the output voltage does not meet the preset standard;

where the constant voltage does not meet the preset standard.

In some implementations, the following voltage element includes:

an offset voltage component configured to output a preset offset voltage; and a voltage adding component electrically coupled to an output terminal of the offset voltage component and the driving voltage terminal and configured to add the offset voltage to the driving voltage and output an added voltage as the following voltage.

In some implementations, the selecting element includes:

a multiplexer including a control terminal and two input terminals, the two input terminals are respectively electrically coupled to the output terminal of the constant voltage element and the output terminal of the following voltage element, the control terminal of the multiplexer is electrically coupled to the comparison element, and the multiplexer is configured to enable corresponding one of the input terminals thereof to be coupled with the output terminal thereof according to a signal at the control terminal thereof.

In some implementations, the comparison element includes:

a threshold voltage component configured to output a preset threshold voltage, where the preset standard is that the output voltage is lower than the threshold voltage, or that the output voltage is higher than the threshold voltage;

a comparison component electrically coupled to the output terminal of the selecting element and an output terminal of the threshold voltage component, and configured to control the selecting element to output the following voltage or the constant voltage according to a relationship between the output voltage and the threshold voltage.

In some implementations, the comparison component includes:

a comparator having two input terminals electrically coupled to the output terminal of the selecting element and the output terminal of the threshold voltage component, respectively, and configured to compare the output voltage with the threshold voltage to output a comparison result signal; and a controller electrically coupled to an output terminal of the comparator and the control terminal of the selecting element, and configured to control the selecting element to output the following voltage or the constant voltage according to the comparison result signal from the output terminal of the comparator.

In some implementations, the gamma standard voltage generating circuit is a gamma standard high voltage generating circuit;

the comparison element is configured to control the selecting element to output the following voltage when the output voltage is lower than a preset threshold voltage and control the selecting element to output the constant voltage when the output voltage is higher than or equal to the preset threshold voltage; and where the following voltage is higher than the driving voltage, the constant voltage is higher than or equal to the threshold voltage, and the output voltage is a gamma standard high voltage.

In some implementations, the gamma standard voltage generating circuit is a gamma standard low voltage generating circuit;

the comparison element is configured to control the selecting element to output the following voltage when the output voltage is higher than a preset threshold voltage and controlling the selecting element to output the constant voltage when the output voltage is lower than or equal to the preset threshold voltage; and where the following voltage is lower than the driving voltage, the constant voltage is lower than or equal to the threshold voltage, and the output voltage is a gamma standard low voltage.

In a second aspect, an embodiment of the present disclosure provides gamma driving voltage generating circuit, including:

a gamma standard high voltage generating circuit;

a gamma standard low voltage generating circuit;

a gamma driving voltage element electrically coupled between an output terminal of a selecting element of the gamma standard high voltage generating circuit and an output terminal of a selecting element of the gamma standard low voltage generating circuit, and configured to generate a gamma driving voltage according to a gamma standard high voltage and a gamma standard low voltage; where the gamma standard high voltage generating circuit and/or the gamma standard low voltage generating circuit is the above-mentioned gamma standard voltage generating circuit, and where in the gamma standard high voltage generating circuit, the comparison element is configured to control the selecting element to output the following voltage when the output voltage is lower than a preset threshold voltage and control the selecting element to output the constant voltage when the output voltage is higher than or equal to the preset threshold voltage, and the following voltage is higher than the driving voltage, the constant voltage is higher than or equal to the threshold voltage, and the output voltage is a gamma standard high voltage; and in the gamma standard low voltage generating circuit, the comparison element is configured to control the selecting element to output the following voltage when the output voltage is higher than a preset threshold voltage and controlling the selecting element to output the constant voltage when the output voltage is lower than or equal to the preset threshold voltage; and the following voltage is lower than the driving voltage, the constant voltage is lower than or equal to the threshold voltage, and the output voltage is a gamma standard low voltage.

In some implementations, the gamma standard high voltage generating circuit and the gamma standard low voltage generating circuit each are any one of the above-mentioned gamma standard voltage generating circuits; and both the following voltage element of the gamma standard high voltage generating circuit and the following voltage element of the gamma standard low voltage generating circuit are electrically coupled to a same driving voltage terminal.

In some implementations, the gamma standard high voltage generating circuit and the gamma standard low voltage generating circuit each are the gamma standard voltage generating circuit including the controller and the comparator, where the gamma standard high voltage generating circuit and the gamma standard low voltage generating circuit share the same controller.

In a second aspect, an embodiment of the present disclosure provides a display device, including:

any one of the above-mentioned gamma driving voltage generating circuits;

a plurality of pixel units configured to display according to the gamma driving voltage generated by the gamma driving voltage generating circuit; and at least one driving voltage element configured to output the driving voltage, and an output terminal of the at least one driving voltage element is electrically coupled to the driving voltage terminal.

In some implementations, the display device is an organic light emitting diode display device;

the driving voltage element includes a positive electrode driving voltage element configured to output a positive electrode driving voltage, and a negative electrode driving voltage element configured to output a negative electrode driving voltage.

In some implementations, an output terminal of the positive electrode driving voltage element is electrically coupled to the driving voltage terminal.

DRAWINGS

DETAILED DESCRIPTION

Figure 1:
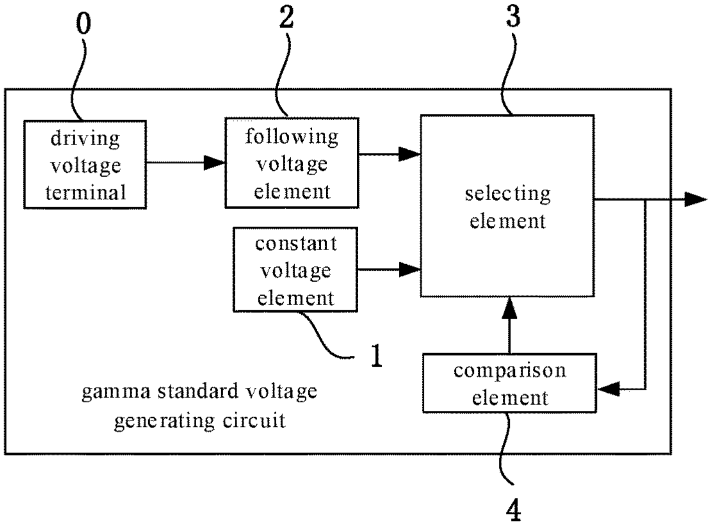
FIG. 1 is a block diagram of a gamma standard voltage generating circuit according to an embodiment of the present disclosure.

In order to enable those skilled in the art to better understand the technical solutions of the embodiments of the present disclosure, the embodiments of the present disclosure are described in further detail below with reference to the accompanying drawings and the detailed description.

It is to be understood that the specific embodiments and drawings described herein are only used to explain the embodiments of the present disclosure and not to limit the present disclosure.

It is to be understood that the various embodiments of the present disclosure and the various features of the embodiments may be combined with each other without conflict.

It is to be understood that, for convenience of description, only portions related to embodiments of the present disclosure are shown in the drawings of the embodiments of the present disclosure, and portions not related to the embodiments of the present disclosure are not shown in the drawings.

Noun explanation

In the present application, unless otherwise specified, the following technical terms should be understood according to the following explanations.

The "driving voltage" is a basic power signal for enabling each pixel unit (sub-pixel) to perform display in the display device; for example, in an Organic Light Emitting Diode (OLED) display device, a driving voltage (EL voltage) includes a positive driving voltage (VDD) applied to a positive electrode of each organic light emitting diode and a negative driving Voltage (VSS) applied to a negative electrode of each organic light emitting diode, the positive driving voltage and the negative driving voltage each being a "power supply voltage" that enables the organic light emitting diode to emit light, and a specific light emitting (display) luminance of the organic light emitting diode is determined by a data voltage (Vdata).

The "gamma driving voltage" is a voltage for enabling each pixel unit to display at a desired luminance for each gray level, and the gamma driving voltage for each gray level is the data voltage (Vdata) corresponding to the gray level.

The "gamma standard voltage" is for generating the gamma driving voltage, and thus a magnitude of the gamma standard voltage directly influences a magnitude of the gamma driving voltage; for example, the gamma standard voltage may include a gamma standard high voltage (VGMP, high voltage of gamma voltage circuit) and a gamma standard low voltage (VGSP, low voltage of gamma voltage circuit), and the gamma driving voltage (data voltage) corresponding to each gray level may be generated by performing different voltage divisions on the gamma standard high voltage and the gamma standard low voltage.

The "following voltage changes with the driving voltage" means that the following voltage is a signal generated according to an input driving voltage, and changes along with the change of the driving voltage, and their changes are in a same direction, namely, the following voltage increases when the input driving voltage increases, and the following voltage decreases when the driving voltage decreases; the specific relationship between the following voltage and the driving voltage may be various, for example, a fixed voltage difference may be maintained between the following voltage and the driving voltage, or there may be a specific proportional relationship between the following voltage and the driving voltage, and the detailed description is omitted here.

In the related art, in a case where the driving voltage (e.g., the positive driving voltage, the negative driving voltage of the OLED display device) of the display device varies, if the gamma driving voltage is unchanged, the display effect (e.g., color shift and brightness difference) is affected (e.g., color shift and brightness difference may occur). In a display device, the driving voltage may change due to leakage current or the like (especially in a low-brightness screen with a small load), or the driving voltages generated by devices of different manufacturers may also changebe different, therefore, if the gamma standard voltage does not change, the generated gamma driving voltage does not change, which may cause the gamma driving voltage to be mismatched with the driving voltage of the display device, thereby affecting the display effect.

In view of above, the gamma standard voltage may be made to change with the driving voltage (or a corresponding gamma standard voltage may be generated according to the driving voltage) to compensate for the gamma standard voltage. However, when the driving voltage is changed greatly (too high or too low) due to an 30 abnormality, the following of the gamma standard voltage may cause a larger change (such as increasing the leakage current) of the driving voltage in the same direction (upward or downward), and the larger change of the driving voltage again causes the gamma standard voltage to be further changed, thereby generating a vicious circle, so that the gamma standard voltage is compensated upward or downward without limitation, resulting into display abnormality.

In a first aspect, referring to FIGS. 1 to 7, an embodiment of the present disclosure provides a gamma standard voltage generating circuit.

The gamma standard voltage generating circuit in the embodiment of the present disclosure is a part of the gamma driving voltage generating circuit. The gamma standard voltage generating circuit in the embodiment of the present disclosure is used for generating the gamma standard voltage according to the driving voltage of the display device; the gamma driving voltage generating circuit generates corresponding gamma driving voltages (data voltages) by using the gamma standard voltage to drive each pixel unit to display.

The gamma standard voltage generating circuit in the embodiment of the present disclosure includes:

a constant voltage element 1 configured to output a constant voltage;

a following voltage element 2 electrically coupled to a driving voltage terminal 0 for outputting a following voltage changing with a driving voltage of the driving voltage terminal 0;

a selecting element 3 electrically coupled to an output terminal of the constant voltage element 1 and an output terminal of the following voltage element 2, for outputting the following voltage or the constant voltage as an output voltage;

a comparison element 4 electrically coupled to an output terminal of the selecting element 3, for controlling the selecting element 3 to output the following voltage when the output voltage meets a preset standard, and controlling the selecting element 3 to output the constant voltage when the output voltage does not meet the preset standard; where, the constant voltage does not meet the preset standard.

Referring to FIG. 1, the gamma standard voltage generating circuit of the present embodiment includes the following voltage element 2 for generating the following voltage changing with the driving voltage, and the constant voltage element 1 for generating the constant voltage; and the selecting element 3 can output one of the following voltage and the constant voltage as the "output voltage", which is the "gamma standard voltage" outputted from the gamma standard voltage generating circuit.

The comparison element 4 compares the output voltage with a preset standard (e.g., threshold voltage), and controls the selecting element 3 to select the following voltage as the output voltage (gamma standard voltage) to output when the output voltage meets the preset standard. Since the gamma standard voltage usually changes with the driving voltage, the gamma standard voltage can be compensated and the display effect can be improved.

When the following voltage is too high or too low due to abnormality of the driving voltage, the following voltage (currently, the output voltage) no longer meets the preset standard, and thus the comparison element 4 controls the selecting element 3 to switch to output the constant voltage, that is, the output gamma standard voltage is the constant voltage and does not change any more, which ensures that the driving voltage does not change any more due to the change of the gamma standard voltage, and avoids unlimited upward or downward compensation of the gamma standard voltage and display abnormality.

Certainly, when the driving voltage returns to a normal range, the selecting element 3 can be caused to output the following voltage again by restarting the circuit or controlling from outside or the like.

In some implementations, the following voltage element 2 includes:

an offset voltage component 21 configured to output a preset offset voltage; and a voltage adding component 22 electrically coupled to an output terminal of the offset voltage component 21 and the driving voltage terminal 0, for adding the offset voltage to the driving voltage from the driving voltage terminal 0 and outputting an added voltage as the following voltage.

Figure 2:
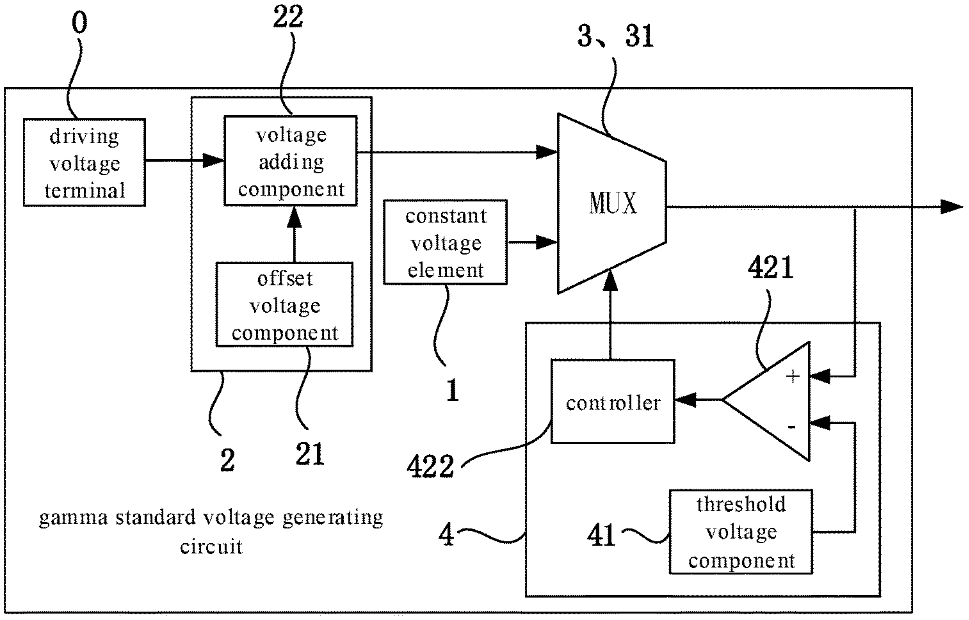
FIG. 2 is a block diagram of another gamma standard voltage generating circuit according to an embodiment of the present disclosure.
Figure 3:
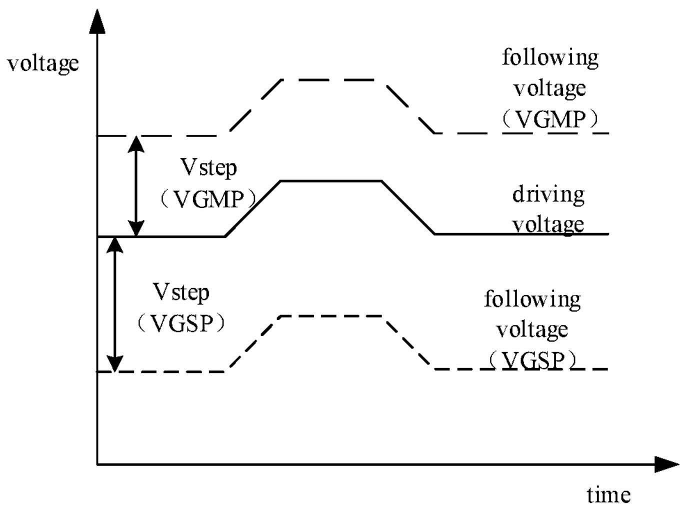
FIG. 3 is a diagram showing a relationship between variations of a following voltage and a driving voltage in a gamma standard voltage generating circuit according to an embodiment of the present disclosure.

Referring to FIG. 2, the following voltage element 2 may include the offset voltage component 21 for generating the offset voltage (Vstep), the offset voltage and the driving voltage are input into the voltage adding component 22, and the voltage adding component 22 outputs a sum of such two voltages as the following voltage, so that the following voltage follows the driving voltage by means of always differing from the driving voltage by the offset voltage (Vstep).

When the offset voltage is of a positive value, the following voltage (for example, the following voltage in the gamma standard high voltage generating circuit) is necessarily higher than the driving voltage; and when the offset voltage is of a negative value, the following voltage is necessarily lower than the driving voltage (e.g. the following voltage in the gamma standard low voltage generating circuit).

The offset voltage (Vstep) may be a preset fixed value or a value that changes according to a certain rule. For example, referring to FIG. 3, in the gamma standard high voltage generating circuit and the gamma standard low voltage generating circuit, the following voltages (denoted by VGMP and VGSP in FIG. 3, respectively) each change with the driving voltage, but are respectively higher and lower than the driving voltage.

It should be understood that the following voltage element 2 is not limited to the above form, and for example, the following voltage element 2 may also amplify or reduce the driving voltage in a certain proportion.

In some implementations, the selecting element 3 includes: a multiplexer 31 including a control terminal, two input terminals and an output terminal, the two input terminals are electrically coupled to the output terminal of the constant voltage element 1 and the output terminal of the following voltage element 2, respectively, the control terminal is electrically coupled to the comparison element 4, and the multiplexer 31 is configured to couple corresponding one of the input terminals to the output terminal, i.e., allow a current between the corresponding one of the input terminals and the output terminal, according to a signal from the control terminal.

Referring to FIG. 2, the selecting element 3 may be in a form of the multiplexer 31 (MUX), and the constant voltage and the following voltage are simultaneously input into the multiplexer 31, and the multiplexer 31 outputs one of the constant voltage and the following voltage according to the signal of the control terminal thereof; so that the control terminal of the multiplexer 31 needs to be electrically coupled to the comparison element 4 to be controlled by the comparison element 4.

It should be understood that the selecting element 3 is not limited to the above form, and may also be a plurality of switches, for example.

In some implementations, the comparison element 4 includes:

a threshold voltage component 41 configured to output a preset threshold voltage; the preset standard is that the output voltage is lower than the threshold voltage, or the output voltage is higher than the threshold voltage; and a comparison component electrically coupled to the output terminal of the selecting element 3 and an output terminal of the threshold voltage component 41, for controlling the selecting element 3 to output the following voltage or the constant voltage according to a relationship between the output voltage and the threshold voltage.

Referring to FIG. 2, the threshold voltage component 41 is configured to generate the preset threshold voltage, according to the preset standard, the output voltage should be higher or lower than the threshold voltage; the comparison component can thus determine whether the output voltage meets the preset standard by comparing the above threshold voltage with the output voltage (i.e., determining whether the threshold voltage is higher or lower than the output voltage), and thereby control the selecting element 3 to output a corresponding voltage.

In some implementations, the comparison component includes:

a comparator 421 having two input terminals electrically coupled to the output terminal of the selecting element 3 and the output terminal of the threshold voltage component 41, respectively, for comparing the output voltage with the threshold voltage and outputting a comparison result signal through an output terminal thereof; and a controller 422 having an input terminal electrically coupled to the output terminal of the comparator 421 and an output terminal electrically coupled to the selecting element 3, for controlling the selecting element 3 to output the following voltage or the constant voltage according to the comparison result signal.

Referring to FIG. 2, the comparison component may include the comparator 421, where the comparator 421 has two input terminals, can compare magnitudes of signals at the two input terminals thereof and output different signals at the output terminal thereof when there are different relationships between the signals at the two input terminals in magnitude; thus, the threshold voltage and the output voltage can be respectively inputted into the comparator 421, the comparator 421 can generate a corresponding "comparison result signal" according to the relationship between magnitudes of the threshold voltage and the output voltage, and the controller 422 can control the selecting element 3 according to the comparison result signal (e.g., the controller 422 is coupled to the control terminal of the multiplexer 31).

Figure 4:
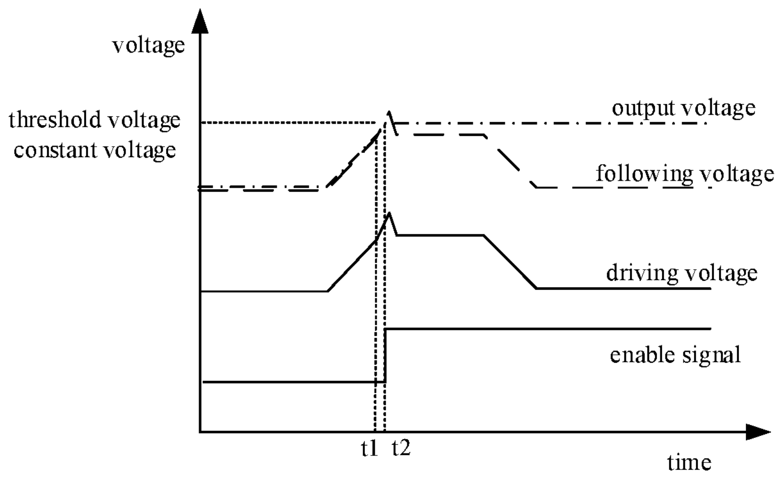
FIG. 4 is a diagram showing a relationship between variations of signals in a gamma standard high voltage generating circuit according to an embodiment of the present disclosure.
Figure 5:
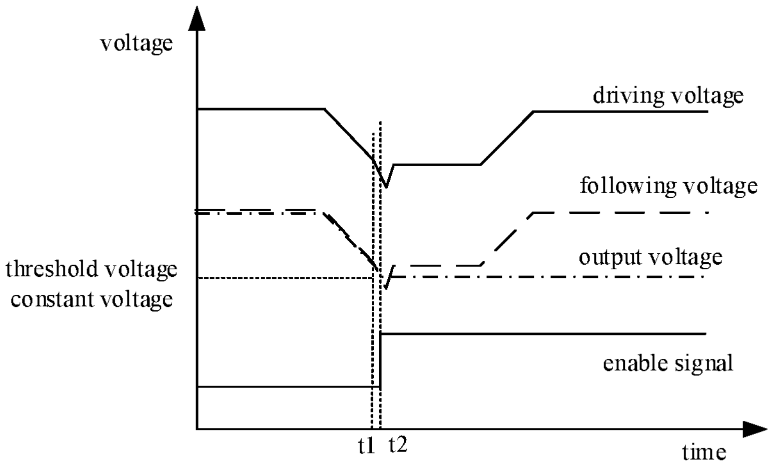
FIG. 5 is a diagram showing a relationship between variations of signals in a gamma standard low voltage generating circuit according to an embodiment of the present disclosure.

For example, referring to FIGS. 4 and 5, when the preset standard is met, an enable signal (EN, i.e., the comparison result signal) output by the comparator 421 may be 0, so that the controller 422 controls the selecting element 3 to output the following voltage; when the preset standard is not met, the enable signal (EN) output by the comparator 421 becomes 1, so that the controller 422 controls the selecting element 3 to output the constant voltage.

It should be understood that the comparison element 4 is not limited to the above form, for example, the comparison element 4 may not include the threshold voltage component 41, but include a controller 422 that directly changes the state thereof when the output voltage exceeds a preset value; for another example, the comparison component may not include the controller 422, and the output of the comparator 421 is directly used to control the selecting element 3.

In some implementations, the gamma standard voltage generating circuit is a gamma standard high voltage generating circuit; where the comparison element 4 is configured to control the selecting element 3 to output the following voltage when the output voltage is lower than the preset threshold voltage, and control the selecting element 3 to output the constant voltage when the output voltage is higher than or equal to the threshold voltage; in such case, the following voltage is higher than the driving voltage, the constant voltage is higher than or equal to the threshold voltage, and the output voltage is a gamma standard high voltage.

Referring to FIG. 4, as an implementation of the embodiment of the present disclosure, the gamma standard voltage generating circuit is used to generate the gamma standard high voltage (VGMP), i.e., a "high voltage" used in the gamma driving voltage generating circuit.

Referring to FIG. 4, in the gamma standard high voltage generating circuit, the following voltage is higher than the driving voltage (the offset voltage is of a positive value as described above), i.e., the following voltage element 2 is used to "raise" the driving voltage, and the output voltage meets the preset standard when it is lower than the threshold voltage.

Thus, referring to FIG. 4, before a timing t1, when the driving voltage fluctuates slightly for some reason (e.g., the driving voltage varies due to leakage current, especially in a low-brightness screen with a small load), the following voltage also fluctuates with the driving voltage, but since the following voltage does not exceed the threshold voltage, the following voltage is always output, that is, the gamma standard high voltage output is the following voltage; at the timing t1, the driving voltage is significantly increased due to abnormality, and till at a timing t2, the following voltage (i.e., output voltage at this time) exceeds the threshold voltage, and the selecting element 3 is switched to output the constant voltage, that is, the gamma standard high voltage output is the constant voltage, which is not too large to cause unlimited upward compensation; since the constant voltage is higher than or equal to the threshold voltage (FIG. 4 shows a case where the constant voltage is equal to the threshold voltage), once the constant voltage starts to be output at the timing t2, even if the abnormality in the driving voltage disappears, and the following voltage returns to the threshold voltage or lower, and the output voltage remains the constant voltage until the circuit is restarted or an external control is performed. The curves of the following voltage and the output voltage prior to the timing t1 in FIG. 4 are shown as not coinciding with each other, this is merely to illustrate both the output voltage and the following voltage, and in fact they are coincident.

In some implementations, the gamma standard voltage generating circuit is a gamma standard low voltage generating circuit; the comparison element 4 is configured to control the selecting element 3 to output the following voltage when the output voltage is higher than the preset threshold voltage and control the selecting element 3 to output the constant voltage when the output voltage is lower than or equal to the threshold voltage; in such case, the following voltage is lower than the driving voltage, the constant voltage is lower than or equal to the threshold voltage, and the output voltage is a gamma standard low voltage.

Referring to FIG. 5, as an implementation of the embodiment of the present disclosure, the gamma standard voltage generating circuit is used to generate the gamma standard low voltage (VGSP), i.e., a "low voltage" used in the gamma driving voltage generating circuit.

Referring to FIG. 5, in the gamma standard low voltage generating circuit, the following voltage is lower than the driving voltage (the offset voltage is of a negative value as described above), i.e., the following voltage element 2 is used to "lower" the driving voltage, and the preset standard is met when the output voltage is higher than the threshold voltage.

Thus, referring to FIG. 5, before a timing t1, when the driving voltage fluctuates slightly for some reason (e.g., the driving voltage varies due to leakage current, especially in a low-brightness screen with a small load), the following voltage fluctuates with it, but since the following voltage is still higher than the threshold voltage, the following voltage is always output, that is, the gamma standard low voltage output is the following voltage; and at the timing t1, the driving voltage is significantly reduced due to abnormality, and till at a timing t2, the following voltage (i.e., output voltage at this time) is lower than the threshold voltage, and the selecting element 3 is switched to output the constant voltage, that is, the gamma standard low voltage output is the constant voltage, which is not too low to cause unlimited downward compensation; since the constant voltage is lower than or equal to the threshold voltage (FIG. 5 shows a case where the constant voltage is equal to the threshold voltage), when the constant voltage starts to be output at the timing t2, even if the abnormality in the driving voltage disappears, and the following voltage returns to the threshold voltage or higher, the output voltage still remains the constant voltage until the circuit is restarted or an external control is performed. The curves of the following voltage and the output voltage prior to the timing t1 in FIG. 5 are shown as not coinciding with each other, this is merely to illustrate both the output voltage and the following voltage, and in fact they are coincident.

The gamma standard voltage generating circuit in the embodiment can avoid the problem that the gamma standard voltage is unlimitedly compensated upwards or downwards to cause abnormal displaying.

Figure 6:
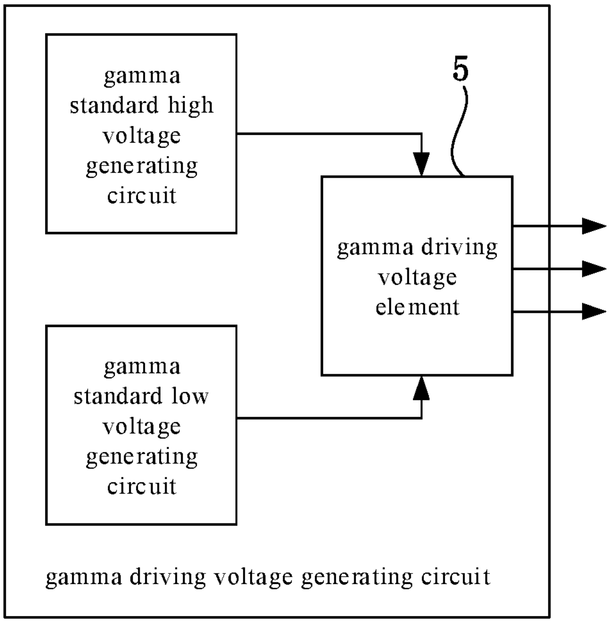
FIG. 6 is a block diagram of a gamma driving voltage generating circuit according to an embodiment of the present disclosure.

In a second aspect, referring to FIG. 6, an embodiment of the present disclosure provides a gamma driving voltage generating circuit, which includes:

a gamma standard high voltage generating circuit;

a gamma standard low voltage generating circuit;

a gamma driving voltage element 5 electrically coupled between an output terminal of a selecting element 3 of the gamma standard high voltage generating circuit and an output terminal of a selecting element 3 of the gamma standard low voltage generating circuit, for generating a gamma driving voltage according to a gamma standard high voltage and a gamma standard low voltage;

where, the gamma standard high voltage generating circuit is any one of the gamma standard voltage generating circuits described above;

and/or, the gamma standard low voltage generating circuit is any one of the gamma standard voltage generating circuits described above.

Figure 7:
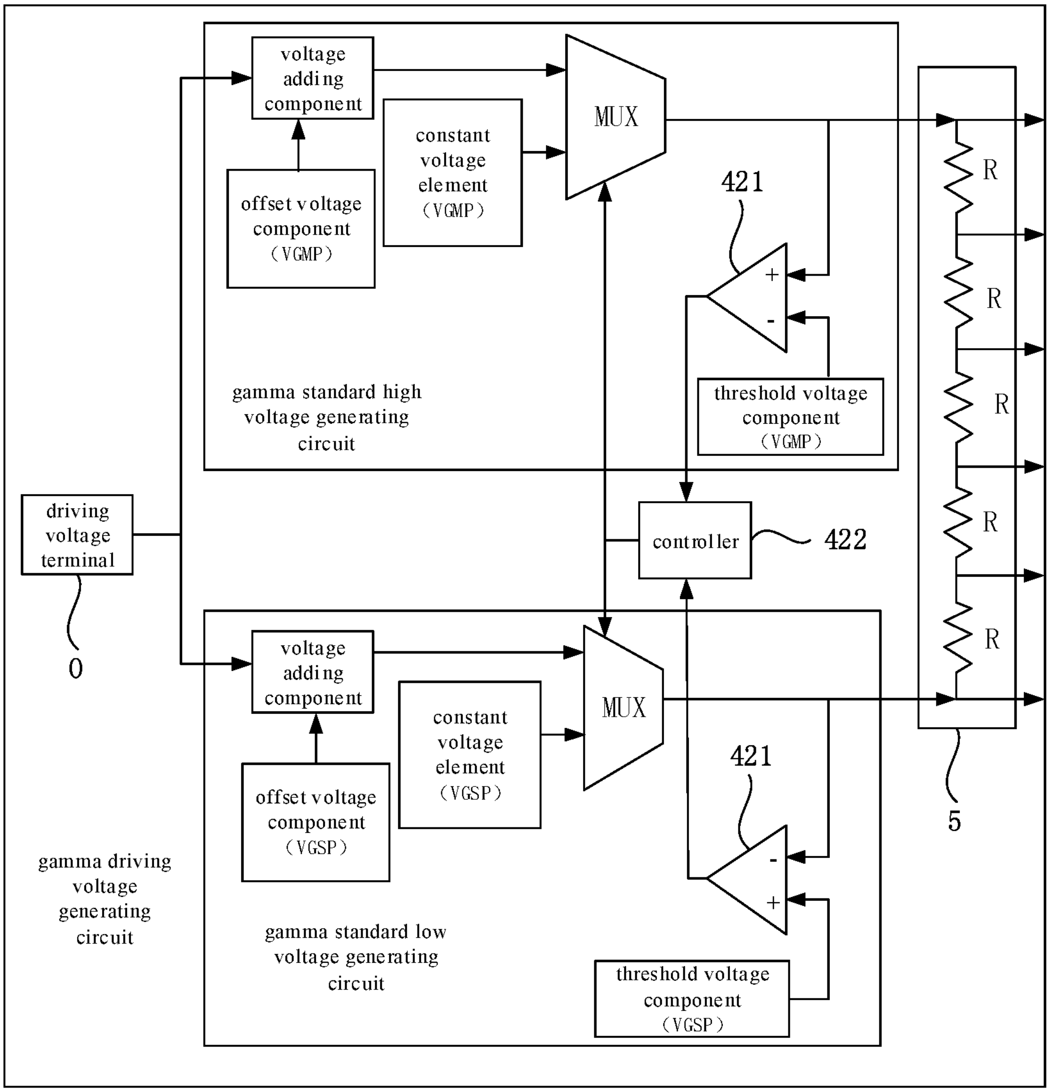
FIG. 7 is a block diagram of a gamma driving voltage generating circuit according to an embodiment of the present disclosure.

Referring to FIG. 7, the gamma driving voltage generating circuit in the embodiment of the present disclosure includes the gamma standard high voltage generating circuit and the gamma standard low voltage generating circuit and generates the gamma driving voltage (data voltage) according to the gamma standard high voltage generated by the gamma standard high voltage generating circuit and the gamma standard low voltage generated by the gamma standard low voltage generating circuit.

At least one of the gamma standard high voltage generating circuit and the gamma standard low voltage generating circuit is the gamma standard voltage generating circuit described above, so that the gamma standard voltage generated thereby cannot be unlimitedly compensated, and abnormal displaying can be avoided.

The specific form of the gamma driving voltage element 5 for generating the gamma driving voltage is various. For example, referring to FIG. 7, the gamma driving voltage component 5 may include a plurality of resistors R (e.g., a variable resistor) coupled in series between the gamma standard high voltage generating circuit and the gamma standard low voltage generating circuit, and different gamma driving voltages may be output between the resistors R through a voltage division of the resistors R.

Referring to FIG. 7, when the gamma standard high voltage generating circuit and the gamma standard low voltage generating circuit each are the gamma standard voltage generating circuit described above, values of the offset voltage, the constant voltage and the threshold voltage required by the gamma standard high voltage generating circuit are obviously different from those required by the gamma standard low voltage generating circuit, therefore, the offset voltage component, the constant voltage element and the threshold voltage component in the gamma standard high voltage generating circuit and the gamma standard low voltage generating circuit should also be different from those in the gamma standard low voltage generating circuit (respectively denoted by VGMP and VGSP in FIG. 7), and different voltage signals are generated.

Referring to FIG. 7, for the gamma standard high voltage generating circuit, the "meet(s) the preset standard" means that the output voltage is lower than the threshold voltage, and for the gamma standard low voltage generating circuit, the "meet(s) the preset standard" means that the output voltage is higher than the threshold voltage, and thus connection relationships of the input terminal for obtaining the output voltage and the input terminal for obtaining the threshold voltage in the comparator 421 of the gamma standard high voltage generating circuit should be contrary to those in the comparator 421 of the gamma standard low voltage generating circuit.

In some implementations, the gamma standard high voltage generating circuit is any one of the above-mentioned gamma standard voltage generating circuits;

the gamma standard low voltage generating circuit is any one of the above-mentioned gamma standard voltage generating circuits;

the following voltage element of the gamma standard high voltage generating circuit and the following voltage element of the gamma standard low voltage generating circuit are electrically coupled to the same driving voltage terminal 0.

Referring to FIG. 7, when the gamma standard high voltage generating circuit and the gamma standard low voltage generating circuit each are the above gamma standard voltage generating circuit, both the following voltage elements thereof can be electrically coupled to the same driving voltage terminal 0, i.e., the gamma standard high voltage and the gamma standard low voltage changes with the same driving voltage (certainly, the gamma standard high voltage and the gamma standard low voltage are respectively higher and lower than the driving voltage), so as to simplify the structure and make the changes of the gamma standard high voltage and the gamma standard low voltage more synchronous.

In some implementations, the gamma standard high voltage generating circuit is the above-mentioned gamma standard voltage generating circuit having the controller 422 and the comparator 421;

the gamma standard low voltage generating circuit is the above-mentioned gamma standard voltage generating circuit having the controller 422 and the comparator 421;

the gamma standard high voltage generating circuit and the gamma standard low voltage generating circuit share the same controller 422.

Referring to FIG. 7, when the gamma standard high voltage generating circuit and the gamma standard low voltage generating circuit include the above controller 422, they can share the same controller 422, that is, the comparators 421 of the gamma standard high voltage generating circuit and the gamma standard low voltage generating circuit are coupled to the same controller 422, and the controller 422 synchronously controls the outputs of the selecting elements 3 in the gamma standard high voltage generating circuit and the gamma standard low voltage generating circuit, so as to simplify the structure.

The gamma driving voltage generating circuit in the embodiment can avoid the problem that the gamma standard voltage may be unlimitedly compensated upwards or downwards to cause abnormal displaying.

In a third aspect, an embodiment of the present disclosure provides a display device, which includes:

any one of the above-mentioned gamma driving voltage generating circuits;

a plurality of pixel units for displaying according to a gamma driving voltage generated by the gamma driving voltage generating circuit; and at least one driving voltage element, an output terminal of which is electrically coupled to the driving voltage terminal, for outputting a driving voltage.

Figure 8:
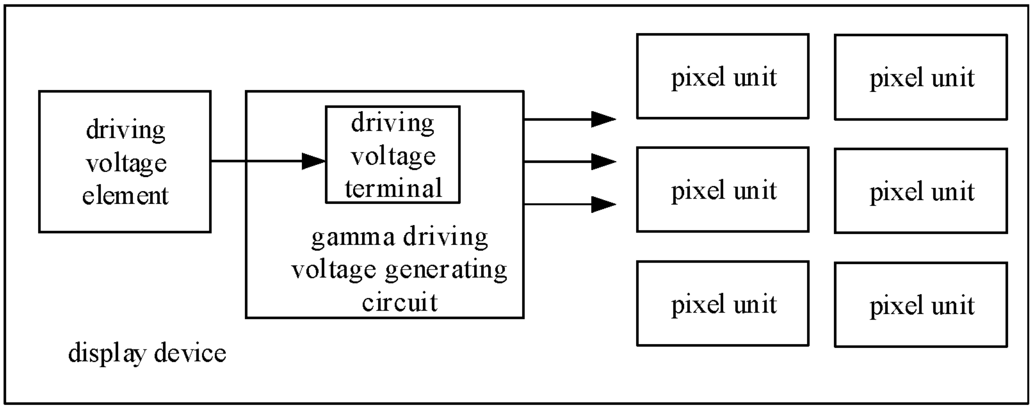
FIG. 8 is a block diagram of a display device according to an embodiment of the present disclosure.

Referring to FIG. 8, the display device according to the embodiment of the present disclosure includes the above gamma driving voltage generating circuit, so that each pixel unit can be driven by the gamma driving voltage generated by the gamma driving voltage generating circuit to perform display, and in the display device, the driving voltage element for generating the driving voltage is coupled to the driving voltage terminal of the above-mentioned gamma driving voltage generating circuit.

With the gamma driving voltage generating circuit described above, the display device of the embodiment of the present disclosure can avoid display abnormity caused by unlimited compensation for the gamma driving voltage.

Specifically, the display device may be any product or component having a display function, such as a display panel, electronic paper, a mobile phone, a tablet computer, a television, a display, a notebook computer, a digital photo frame, and a navigator.

In some implementations, the display device is an organic light emitting diode display device;

the driving voltage element includes: a positive electrode driving voltage element for outputting a positive electrode driving voltage and a negative electrode driving voltage element for outputting a negative electrode driving voltage.

Figure 9:
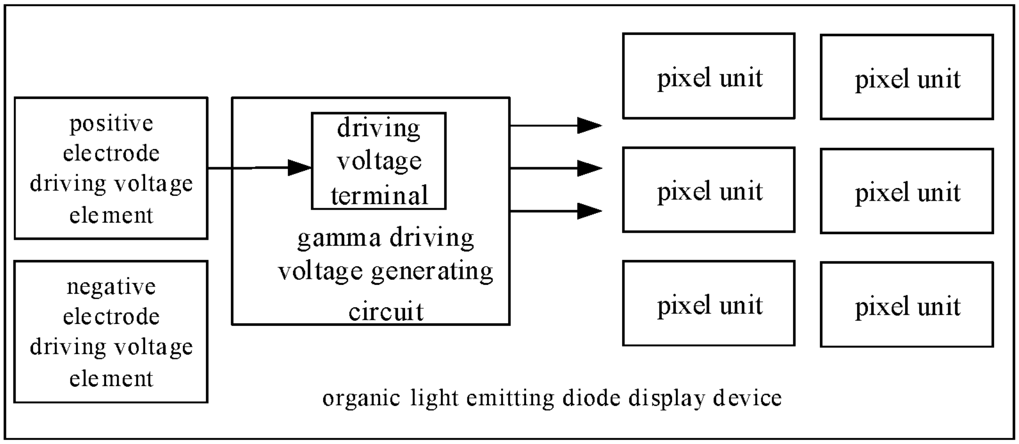
FIG. 9 is a block diagram of a display device according to an embodiment of the present disclosure.

Referring to FIG. 9, as an implementation of the embodiment of the present disclosure, the display device may be an Organic Light Emitting Diode (OLED) display device, such that the driving voltage (EL voltage) therein may include the positive electrode driving voltage (VDD) applied to a positive electrode of each organic light emitting diode and the negative electrode driving voltage (VSS) applied to a negative electrode of each organic light emitting diode, certainly, the two driving voltages need to be generated by different driving voltage elements.

It should be understood that the display device may be of other forms, for example, may be a Liquid Crystal Display (LCD), and that the specific driving voltages may change from display device to display device.

In some implementations, the output terminal of the positive electrode driving voltage element is electrically coupled to the driving voltage terminal.

Further, referring to FIG. 9, in the organic light emitting diode display device, the output terminal of the positive electrode driving voltage element may be coupled to the driving voltage terminal, i.e., both the gamma standard high voltage and the gamma standard low voltage may change with the positive electrode driving voltage (VDD) (certainly, the gamma standard high voltage and the gamma standard low voltage are respectively higher and lower than the positive electrode driving voltage).

It should be understood that the driving voltage element may be coupled to the driving voltage terminal in different manners, for example, the output terminal of the negative electrode driving voltage element may be coupled to the driving voltage terminal, or the output terminal of the positive electrode driving voltage element and the output terminal of the negative electrode driving voltage element may be coupled to the driving voltage terminal of the gamma standard high voltage generating circuit and the driving voltage terminal of the gamma standard low voltage generating circuit, respectively.

It will be understood that the above embodiments are merely exemplary embodiments adopted to illustrate the principles of the embodiments of the present disclosure, and the present disclosure is not limited thereto. It will be apparent to those skilled in the art that various modifications and changes can be made without departing from the spirit and scope of the embodiments of the present disclosure, and such modifications and changes are also considered to be within the scope of the present disclosure.

The invention claimed is:

1. A gamma standard voltage generating circuit, comprising:

a constant voltage element configured to output a constant voltage;

a following voltage element electrically coupled to a driving voltage terminal and configured to output a following voltage changing with a driving voltage of the driving voltage terminal;

a selecting element electrically coupled to an output terminal of the constant voltage element and an output terminal of the following voltage element, and configured to output the following voltage or the constant voltage as an output voltage at an output terminal thereof, the output voltage is a gamma standard voltage for generating gamma driving voltages at gray levels by performing voltage divisions thereon;

a comparison element electrically coupled to the output terminal of the selecting element, and configured to control the selecting element to output the following voltage in response to that the output voltage meets a preset standard, and control the selecting element to output the constant voltage in response to that the output voltage does not meet the preset standard;

wherein the preset standard is one of: i) the output voltage is lower than a threshold voltage, or, ii) the output voltage is higher than the threshold voltage; and the constant voltage is one of i) higher than or equal to the threshold voltage; or ii) lower than or equal to the threshold voltage, respectively.

2. The gamma standard voltage generating circuit of claim 1, wherein the following voltage element comprises:

an offset voltage component configured to output a preset offset voltage; and a voltage adding component electrically coupled to an output terminal of the offset voltage component and the driving voltage terminal and configured to add the offset voltage to the driving voltage and output an added voltage as the following voltage.

3. The gamma standard voltage generating circuit of claim 1, wherein the selecting element comprises:

a multiplexer comprising a control terminal and two input terminals, the two input terminals are respectively electrically coupled to the output terminal of the constant voltage element and the output terminal of the following voltage element, the control terminal of the multiplexer is electrically coupled to the comparison element, and the multiplexer is configured to enable corresponding one of the input terminals thereof to be electrically coupled with the output terminal thereof according to a signal at the control terminal thereof.

4. The gamma standard voltage generating circuit of claim 1, wherein the comparison element comprises:

a threshold voltage component configured to output the threshold voltage;

a comparison component electrically coupled to the output terminal of the selecting element and an output terminal of the threshold voltage component, and configured to control the selecting element to output the following voltage or the constant voltage according to a relationship between the output voltage and the threshold voltage.

5. The gamma standard voltage generating circuit of claim 4, wherein the comparison component comprises:

a comparator having two input terminals electrically coupled to the output terminal of the selecting element and the output terminal of the threshold voltage component, respectively, and configured to compare the output voltage with the threshold voltage to output a comparison result signal; and a controller electrically coupled to an output terminal of the comparator and the control terminal of the selecting element, and configured to control the selecting element to output the following voltage or the constant voltage according to the comparison result signal from the output terminal of the comparator.

6. The gamma standard voltage generating circuit of claim 1, wherein the gamma standard voltage generating circuit is a gamma standard high voltage generating circuit;

the comparison element is configured to control the selecting element to output the following voltage in response to that the output voltage is lower than a preset threshold voltage, and control the selecting element to output the constant voltage in response to that the output voltage is higher than or equal to the preset threshold voltage; and wherein the following voltage is higher than the driving voltage, the constant voltage is higher than or equal to the threshold voltage, and the output voltage is a gamma standard high voltage.

7. The gamma standard voltage generating circuit of claim 1, wherein the gamma standard voltage generating circuit is a gamma standard low voltage generating circuit;

the comparison element is configured to control the selecting element to output the following voltage in response to that the output voltage is higher than a preset threshold voltage and controlling the selecting element to output the constant voltage in response to that the output voltage is lower than or equal to the preset threshold voltage; and wherein the following voltage is lower than the driving voltage, the constant voltage is lower than or equal to the threshold voltage, and the output voltage is a gamma standard low voltage.

8. The gamma standard voltage generating circuit of claim 2, wherein the selecting element comprises:

a multiplexer comprising a control terminal and two input terminals, the two input terminals are respectively electrically coupled to the output terminal of the constant voltage element and the output terminal of the following voltage element, the control terminal of the multiplexer is electrically coupled to the comparison element, and the multiplexer is configured to enable corresponding one of the input terminals thereof to be electrically coupled with the output terminal thereof according to a signal at the control terminal thereof.

9. The gamma standard voltage generating circuit of claim 8, wherein the comparison element comprises:

a threshold voltage component configured to output a preset threshold voltage, wherein the preset standard is that the output voltage is lower than the threshold voltage, or that the output voltage is higher than the threshold voltage;

a comparison component electrically coupled to the output terminal of the selecting element and an output terminal of the threshold voltage component, and configured to control the selecting element to output the following voltage or the constant voltage according to a relationship between the output voltage and the threshold voltage.

10. The gamma standard voltage generating circuit of claim 9, wherein the comparison component comprises:

a comparator having two input terminals electrically coupled to the output terminal of the selecting element and the output terminal of the threshold voltage component, respectively, and configured to compare the output voltage with the threshold voltage to output a comparison result signal; and a controller electrically coupled to an output terminal of the comparator and the control terminal of the selecting element, and configured to control the selecting element to output the following voltage or the constant voltage according to the comparison result signal from the output terminal of the comparator.

11. A gamma driving voltage generating circuit, comprising:

a gamma standard high voltage generating circuit;

a gamma standard low voltage generating circuit;

a gamma driving voltage element electrically coupled between an output terminal of a selecting element of the gamma standard high voltage generating circuit and an output terminal of a selecting element of the gamma standard low voltage generating circuit, and configured to generate a gamma driving voltage according to a gamma standard high voltage and a gamma standard low voltage; wherein the gamma standard high voltage generating circuit and/or the gamma standard low voltage generating circuit is a gamma standard voltage generating circuit , the gamma standard voltage generating circuit comprises: a constant voltage element configured to output a constant voltage; a following voltage element electrically coupled to a driving voltage terminal and configured to output a following voltage changing with a driving voltage of the driving voltage terminal; a selecting element electrically coupled to an output terminal of the constant voltage element and an output terminal of the following voltage element, and configured to output the following voltage or the constant voltage as an output voltage at an output terminal thereof, the output voltage is a gamma standard voltage for generating gamma driving voltages at gray levels by performing voltage divisions thereon; a comparison element electrically coupled to the output terminal of the selecting element, and configured to control the selecting element to output the following voltage in response to that the output voltage meets a preset standard, and control the selecting element to output the constant voltage in response to that the output voltage does not meet the preset standard; wherein the preset standard is one of:

i) the output voltage is lower than a threshold voltage, or,ii) the output voltage is higher than the threshold voltage; and the constant voltage is one of i) higher than or equal to the threshold voltage; or ii) lower than or equal to the threshold voltage, respectively, and wherein in the gamma standard high voltage generating circuit, the comparison element is configured to control the selecting element to output the following voltage in response to that the output voltage is lower than the threshold voltage and control the selecting element to output the constant voltage in response to that the output voltage is higher than or equal to the threshold voltage, and the following voltage is higher than the driving voltage, the constant voltage is higher than or equal to the threshold voltage, and the output voltage is a gamma standard high voltage; and in the gamma standard low voltage generating circuit, the comparison element is configured to control the selecting element to output the following voltage in response to that the output voltage is higher than the threshold voltage and control the selecting element to output the constant voltage in response to that the output voltage is lower than or equal to the threshold voltage; and the following voltage is lower than the driving voltage, the constant voltage is lower than or equal to the threshold voltage, and the output voltage is a gamma standard low voltage.

12. The gamma driving voltage generating circuit of claim 11, wherein, the gamma standard high voltage generating circuit and the gamma standard low voltage generating circuit each are the gamma standard voltage generating circuit; and wherein both the following voltage element of the gamma standard high voltage generating circuit and the following voltage element of the gamma standard low voltage generating circuit are electrically coupled to the same driving voltage terminal.

13. A gamma driving voltage generating circuit, comprising:

a gamma standard high voltage generating circuit;

a gamma standard low voltage generating circuit;

a gamma driving voltage element electrically coupled between an output terminal of a selecting element of the gamma standard high voltage generating circuit and an output terminal of a selecting element of the gamma standard low voltage generating circuit, and configured to generate a gamma driving voltage according to a gamma standard high voltage and a gamma standard low voltage; wherein the gamma standard high voltage generating circuit and/or the gamma standard low voltage generating circuit is a gamma standard voltage generating circuit, the gamma standard voltage generating circuit comprises a constant voltage element configured to output a constant voltage;

a following voltage element electrically coupled to a driving voltage terminal and configured to output a following voltage changing with a driving voltage of the driving voltage terminal; a selecting element electrically coupled to an output terminal of the constant voltage element and an output terminal of the following voltage element, and configured to output the following voltage or the constant voltage as an output voltage at an output terminal thereof, the output voltage is a gamma standard voltage for generating gamma driving voltages at gray levels by performing voltage divisions thereon; a comparison element electrically coupled to the output terminal of the selecting element, and configured to control the selecting element to output the following voltage in response to that the output voltage meets a preset standard, and control the selecting element to output the constant voltage in response to that the output voltage does not meet the preset standard, wherein the preset standard is one of: i) the output voltage is lower than a threshold voltage, or,ii) the output voltage is higher than the threshold voltage; and the constant voltage is one of i) higher than or equal to the threshold voltage; or ii) lower than or equal to the threshold voltage, respectively; the following voltage element comprises an offset voltage component configured to output a preset offset voltage, and a voltage adding component electrically coupled to an output terminal of the offset voltage component and the driving voltage terminal and configured to add the offset voltage to the driving voltage and output an added voltage as the following voltage; the selecting element comprises a multiplexer comprising a control terminal and two input terminals, the two input terminals are respectively electrically coupled to the output terminal of the constant voltage element and the output terminal of the following voltage element, the control terminal of the multiplexer is electrically coupled to the comparison element, and the multiplexer is configured to enable corresponding one of the input terminals thereof to be electrically coupled with the output terminal thereof according to a signal at the control terminal thereof; the comparison element comprises a threshold voltage component configured to output a preset threshold voltage, wherein the preset standard is that the output voltage is lower than the threshold voltage, or that the output voltage is higher than the threshold voltage; a comparison component electrically coupled to the output terminal of the selecting element and an output terminal of the threshold voltage component, and configured to control the selecting element to output the following voltage or the constant voltage according to a relationship between the output voltage and the threshold voltage; the comparison component comprises a comparator having two input terminals electrically coupled to the output terminal of the selecting element and the output terminal of the threshold voltage component, respectively, and configured to compare the output voltage with the threshold voltage to output a comparison result signal; and a controller electrically coupled to an output terminal of the comparator and the control terminal of the selecting element, and configured to control the selecting element to output the following voltage or the constant voltage according to the comparison result signal from the output terminal of the comparator, and wherein in the gamma standard high voltage generating circuit, the comparison element is configured to control the selecting element to output the following voltage in response to that the output voltage is lower than a preset threshold voltage and control the selecting element to output the constant voltage in response to that the output voltage is higher than or equal to the preset threshold voltage, and the following voltage is higher than the driving voltage, the constant voltage is higher than or equal to the threshold voltage, and the output voltage is a gamma standard high voltage; and in the gamma standard low voltage generating circuit, the comparison element is configured to control the selecting element to output the following voltage in response to that the output voltage is higher than a preset threshold voltage and control the selecting element to output the constant voltage in response to that the output voltage is lower than or equal to the preset threshold voltage; and the following voltage is lower than the driving voltage, the constant voltage is lower than or equal to the threshold voltage, and the output voltage is a gamma standard low voltage.

14. The gamma driving voltage generating circuit of claim 13, wherein, the gamma standard high voltage generating circuit and the gamma standard low voltage generating circuit each are the gamma standard voltage generating circuit; and both the following voltage element of the gamma standard high voltage generating circuit and the following voltage element of the gamma standard low voltage generating circuit are electrically coupled to the same driving voltage terminal.

15. The gamma driving voltage generating circuit of claim 14, wherein, the gamma standard high voltage generating circuit and the gamma standard low voltage generating circuit share a same controller.

16. A display device, comprising:

the gamma driving voltage generating circuit of claim 11;

a plurality of pixel units configured to display according to the gamma driving voltage generated by the gamma driving voltage generating circuit; and at least one driving voltage element configured to output the driving voltage, and an output terminal of the at least one driving voltage element is electrically coupled to the driving voltage terminal.

17. The display device according to claim 16, the display device is an organic light emitting diode display device;

the driving voltage element comprises a positive electrode driving voltage element configured to output a positive electrode driving voltage, and a negative electrode driving voltage element configured to output a negative electrode driving voltage.

18. The display device according to claim 17, an output terminal of the positive electrode driving voltage element is electrically coupled to the driving voltage terminal.

* * * * *